United States Patent [19]

Hu et al.

[11] Patent Number: 5,450,769
[45] Date of Patent: Sep. 19, 1995

[54] CLOCK SPRING CONNECTOR WITH REDUCED-NOISE OPERATION

[75] Inventors: Thomas S. Hu, Mission Viejo; Vas R. Kommera, Artesia, both of Calif.; John E. Opie, Clarkston, Mich.

[73] Assignee: Alps Electric (USA) Inc., San Jose, Calif.

[21] Appl. No.: 159,155

[22] Filed: Nov. 30, 1993

[51] Int. Cl.⁶ .................. H01R 35/04; B62D 1/16
[52] U.S. Cl. ............................ 74/492; 74/484 R; 403/326; 439/15; 439/164
[58] Field of Search .......... 74/492, 484 R; 439/15, 439/164; 403/326, 335, 338; 185/39, 45

[56] References Cited

U.S. PATENT DOCUMENTS

| | | | |
|---|---|---|---|
| 3,298,072 | 1/1967 | Whalen | 403/326 |
| 4,422,699 | 12/1983 | Sakurai et al. | 439/15 |
| 4,598,602 | 7/1986 | Kurata et al. | 74/484 R |
| 4,662,477 | 5/1987 | Minoru | 185/39 X |
| 4,714,430 | 12/1987 | Zeller | 439/15 |
| 4,768,394 | 9/1988 | Mizuno et al. | 74/484 R |
| 4,975,064 | 12/1990 | Takahashi et al. | 439/15 |
| 5,061,195 | 10/1991 | Bolen | 439/164 |
| 5,259,775 | 11/1993 | Kubota et al. | 439/15 X |

*Primary Examiner*—Allan D. Herrmann
*Attorney, Agent, or Firm*—Guy W. Shoup

[57] ABSTRACT

A steering column assembly including a clock spring connector having a groove formed on a movable member for receiving a ridge formed on an engaging member of a steering wheel. The engagement of the ridge and the groove provides a reduced-noise operation of the steering column apparatus. A resilient clip is provided between the groove and the ridge to further reduce operating noise. A pair of flanges are formed on an outer wall of the clock spring connector to secure the clock spring connector to a lock fixture. A short forked locking finger is provided on a back surface of the clock spring connector for preventing damage during assembly.

9 Claims, 13 Drawing Sheets

CLOCK SPRING CONNECTOR WITH REDUCED-NOISE OPERATION

BACKGROUND OF THE INVENTION

1. Field of the Invention

The present invention is related to a steering column assembly and more particularly to a steering column assembly which reduces undesirable passenger compartment noise.

2. Description of the Prior Art

A recent trend in automobile design is to decrease passenger compartment noise in order to make driving more enjoyable. Passenger compartment noise is noise detected in the passenger compartment of an automobile and is comprised of external noise and internal noise. External noise originates from sources located outside of the passenger compartment; for example, noise produced by the automobile's engine and tires, and noise produced by traffic. Internal noise is generated by devices located in the passenger compartment. In the past, the external noise component of passenger compartment noise was significantly greater than the internal noise component. As such, clicks and squeaks of switch mechanisms located in the passenger compartment of an older automobile are typically "drowned out" by external noise. More recently, however, several technologies have been combined to reduce external noise by, for example, reducing engine noise and incorporating sound-proofing materials into the automobile body to block traffic noise. As the external noise component of passenger compartment noise is decreased, the clicks and squeaks associated with internal noise devices become more noticeable and irritating.

Therefore, in order to further reduce passenger compartment noise, there is a need for mechanisms located in the passenger compartment which exhibit silent operation.

FIG. 1 shows an exploded perspective view of a typical prior art steering column assembly 1. The steering column assembly 1 includes a lock fixture 10 connected to a steering column (not shown), a steering shaft 20 rotatably mounted within the steering column and having an end portion extending through the lock fixture 10, a switch assembly 30, an upper housing 40, a lower housing 45 and a clock spring connector 50 mounted on the lock fixture 10, and a steering wheel 60 mounted on the steering shaft 20. The lock fixture 10 includes a front plate 11, a pair of vertical posts 12 extending from an upper edge of the front plate 11, and a pair of horizontal flanges 13 located on opposite sides of the front plate 11. The switch assembly 30 is mounted on the vertical posts 12, and the horizontal flanges 13 receive a screw connecting the upper housing 40 and the lower housing 45. The clock spring connector 50 is snap-coupled to a front surface of the front plate 11 over the steering shaft 20. Finally, the steering wheel 60 is fixedly connected to the steering shaft 20 and engages the clock spring connector 50 as described below.

FIG. 2 shows an enlarged perspective view illustrating the clock spring connector 50 and a portion of the steering wheel 60 of the steering column assembly 1. The clock spring connector 50 includes a fixed member 51 and a movable member 52 rotatably connected to the fixed member 51. An engaging portion 61 is connected to and extends from the steering wheel 60. When the steering wheel 60 is connected to the steering shaft 20, the engaging portion 61 is received within the recess 53, and manual rotation of the steering wheel 60 produces a concomitant rotation of the movable member 52 relative to the fixed member 51.

FIG. 3 shows a simplified front section view illustrating the connection between the engaging portion 61 and the recess 53. A clearance C of approximately 1.5 mm is provided between the engaging portion 61 and the recess 53 to facilitate assembly. When the steering wheel 60 is rotated from the position indicated by solid lines to the positions 61(1) and 61(2) indicated by dashed lines, the engaging portion 61 rotates an angle Θ of approximately 5° without contacting the walls of the recess 53. As such, a range of free motion of the steering wheel 60 is present in the steering column assembly 1. Of course, when the steering wheel 60 is turned beyond the angle Θ, the engaging portion 61 presses against the walls of the recess 53, thereby rotating the movable member 52 relative to the fixed member 51.

FIGS. 4(a) and 4(b) show top and side views, respectively, of the clock spring connector 50 connected to the lock fixture 10. Referring to FIG. 4(a), the clock spring connector 50 includes an upper locking finger 54 and a lower locking finger 55. As best illustrated in FIG. 1, the lock fixture 10 includes an opening 14 and a slot 15 formed on the front plate 11. In addition, the lock fixture 10 includes an upper vertical flange 16 and a lower vertical flange 17 located behind the front plate 11. The opening 14 and the receiving slot 15 are formed with a width W which provides a clearance of approximately 3 mm between the locking fingers 54, 55 and the opening 14 and slot 15 to facilitate assembly. When the clock spring connector 50 is connected to the lock fixture 10, the upper locking finger 54 extends through the opening 14 and is held by the upper vertical flange 16. Similarly, the lower locking finger 55 extends along the receiving slot 15 and is held by the lower vertical flange 17.

A problem with the above-described prior art steering column assembly 1 is that the clearance C between the engaging portion 61 and the recess 53 results in a clicking noise when the steering wheel 60 is rotated. Referring to FIG. 3, when the engaging portion 61 is rotated from the position 61(1) to the position 61(2), the resulting collision between the engaging portion 61 and the recess 53 generates an audible click which can be heard in the passenger compartment of an automobile.

Another problem associated with the prior art steering column assembly 1 is that the clearance between the engaging portion 61 and the recess 53 reduces the sensitivity of a turn signal canceling mechanism. The turn signal canceling mechanism (not shown) is mounted on the switch assembly 30 and is actuated by rotation of the movable member 52. Because of the range of free motion due to the clearance C, discussed above, actuation of the turn signal canceling mechanism is delayed after each turn until the steering wheel 60 is rotated through the angle Θ, as shown in FIG. 3.

Another problem associated with the prior art steering column assembly 1 is that the fixed member 51 shifts relative to the lock fixture 10 due to the clearance provided between the locking fingers 54, 55 and the opening 14 and slot 15, thereby creating noise. That is, as the steering wheel is turned, friction between the movable member 52 and the fixed member 51 causes the fixed member 51 to move relative to the lock fixture 10 until the upper finger 54 and the lower finger 55 abut the edges of the opening 14 and the slot 15. This relative movement causes audible noises which can be heard in the passenger compartment.

Still another problem associated with the prior art steering column assembly 1 is that the upper locking finger 54 can become cracked or damaged before mounting onto the lock fixture 10. That is, the clock spring connector 50 includes a rigid socket structure 56 (FIG. 4) which is located near the lower locking finger 55. The socket housing 56 protects the lower locking finger 55 during handling prior to assembly. However, the upper locking finger 54 is not protected and can be cracked prior to assembly, and then broken-off during use, thereby producing a loud noise each time the turn signal canceling mechanism is activated.

SUMMARY OF THE INVENTION

It is an object of the present invention to overcome the limitations of the above-described prior art steering column assembly.

In accordance with one aspect of the present invention, a clock spring connector is disclosed which includes a movable member which defines a groove for receiving a ridge formed on an engaging member of a steering wheel such that manual rotation of the steering wheel is transmitted to the movable member through contact between the groove and the ridge. The groove and ridge structure reduces the clearance between the movable member and the engaging member, thereby reducing noise when the steering wheel is turned.

In accordance with another aspect of the present invention, a resilient clip is positioned between the key groove and the ridge. The resilient member prevents the movable member from striking the engaging member when the steering wheel is turned, thereby preventing noise generated by contact between the engaging portion and the movable member.

In accordance with another aspect of the present invention, a fixed member of the clock spring connector includes an outer cylindrical wall and a flat mounting flange fixedly connected to and radially extending from the outer cylindrical wall. The flat mounting flange is received on a horizontal flange located on a lock fixture to which the clock spring connector is attached, thereby preventing rotation of the fixed member relative to the lock fixture.

In accordance with another aspect of the present invention, a short, forked locking finger is used to connect the clock spring connector to the lock fixture. The forked locking finger reduces damage of the locking fingers during assembly, thereby reducing noise caused by breakage of the locking fingers after assembly.

BRIEF DESCRIPTION OF THE DRAWINGS

These and other features, aspects and advantages of the present invention will become better understood with regard to the following description, appended claims, and accompanying drawings where:

DETAILED DESCRIPTION

As used herein, the term "steering column assembly" refers to fixtures, devices and structures typically associated with the steering column of an automobile.

Figure 5:
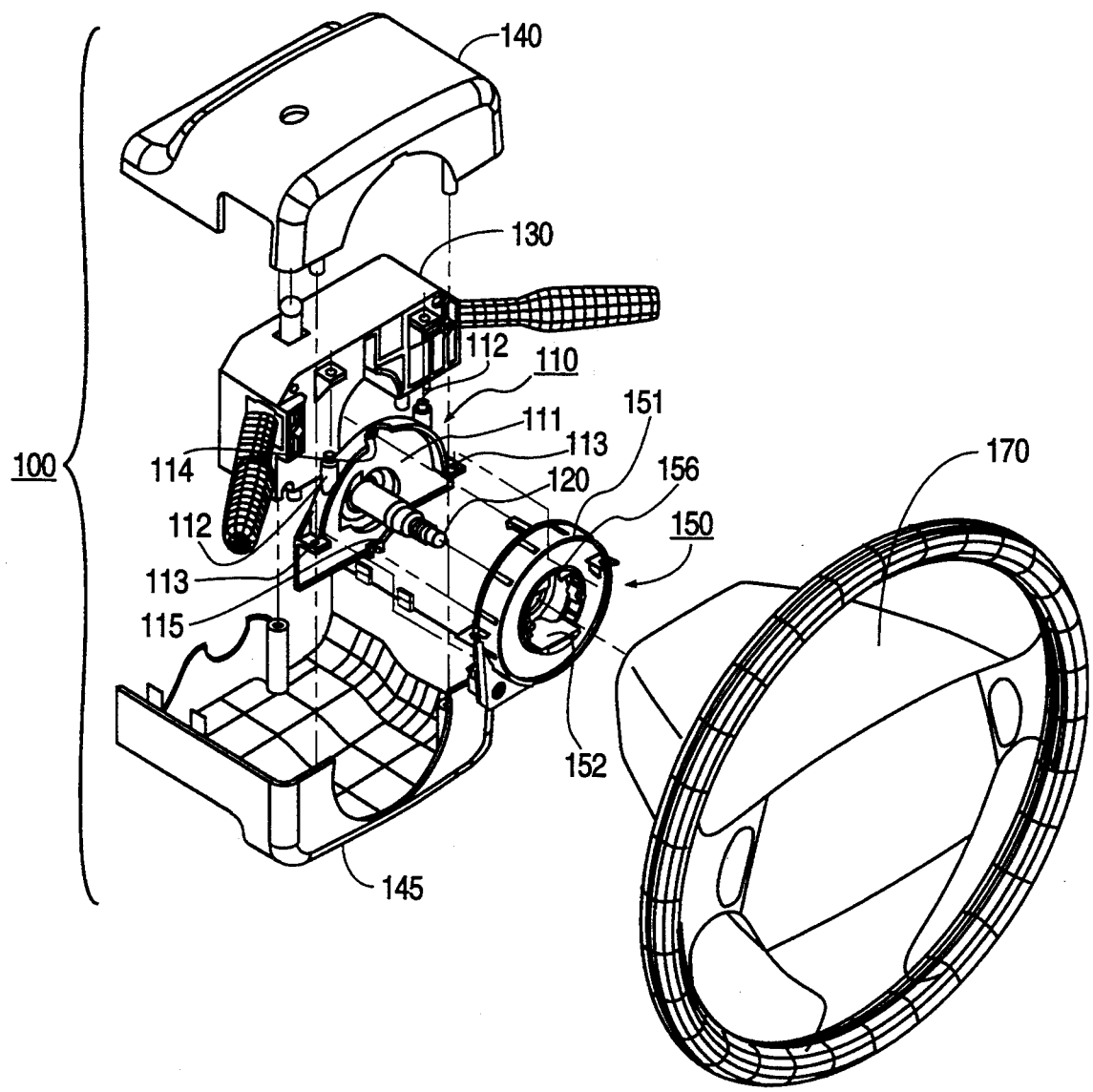
FIG. 5 shows an exploded perspective view of a steering column assembly in accordance with the present invention.

FIG. 5 shows a exploded perspective view of a steering column assembly 100 in accordance with the present invention. The steering column assembly 100 includes a lock fixture 110 connected to a steering column (not shown), a steering shaft 120 rotatably mounted within the steering column and having an end portion extending through the lock fixture 110, a switch assembly 130, an upper housing 140, a lower housing 145 and a clock spring connector 150 mounted on the lock fixture 110, and a steering wheel 170 mounted on the steering shaft 120. The lock fixture 110 includes a front plate 111, a pair of vertical posts 112 extending from an upper edge of the front plate 111, and a pair of horizontal flanges 113 located on opposite sides of the front plate 111. The switch assembly 130 is mounted on the vertical posts 112, and the horizontal flanges 113 receive a screw connecting the upper housing 140 and the lower housing 145. That is, the intended purpose for the horizontal flanges 113 is to provide a mounting point for the upper housing 140 and the lower housing 145. The clock spring connector 150 is snap-coupled to a front surface of the front plate 111 over the steering shaft 120. Similar to the prior art clock spring connector 50 (described above), the clock spring connector 150 includes a fixed member 151 which is snap-coupled to the front plate 111, and a movable member 152 which is rotatably connected to the fixed member 151. Finally, the steering wheel 170 is fixedly connected to the steering shaft 120 and engages the clock spring connector 150 as described below.

Figure 6A:
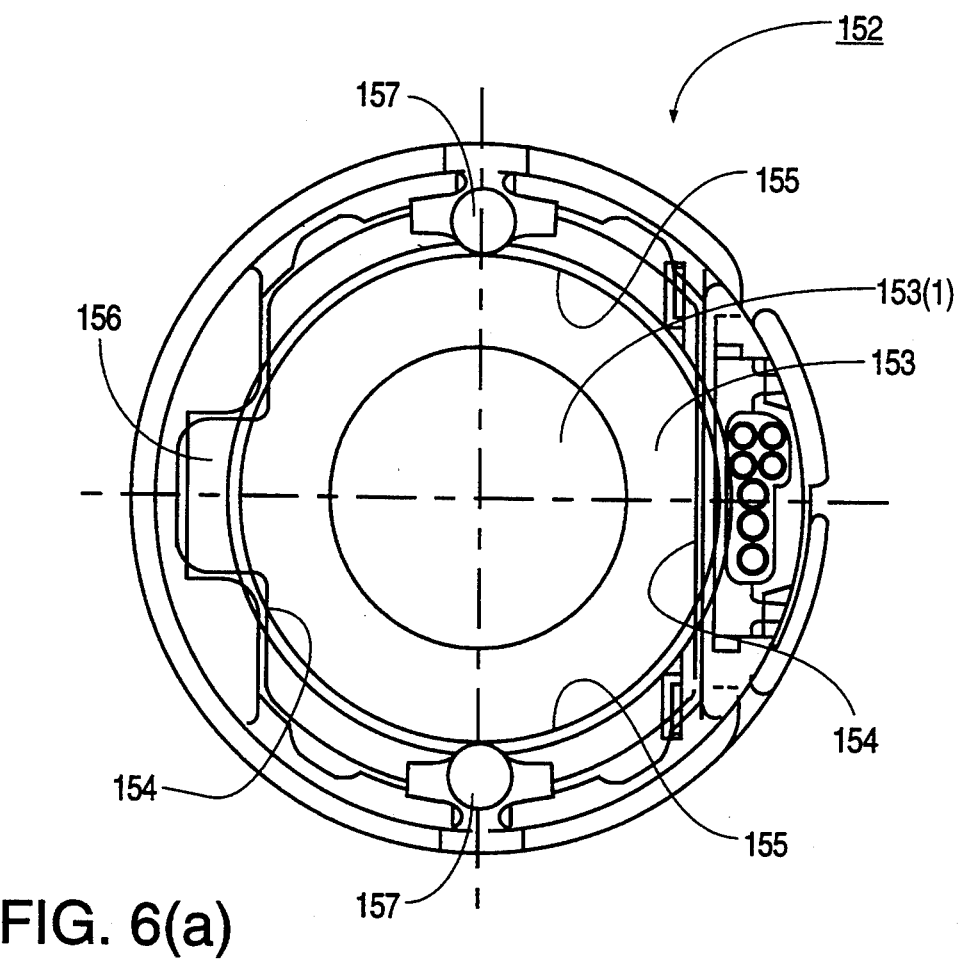
FIGS. 6(a) and 6(b) show front and side views of a movable member of a clock spring connector in accordance with a first embodiment of the present invention.
Figure 6B:
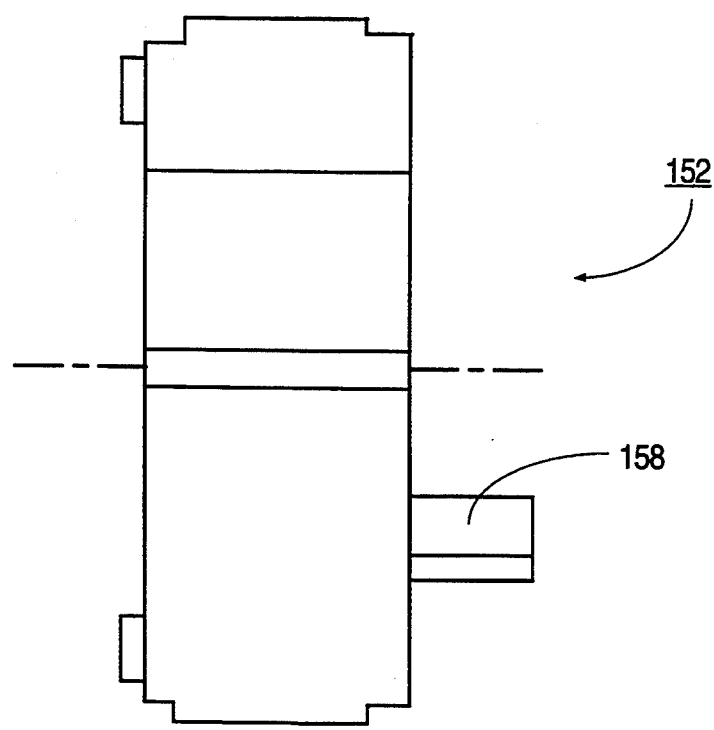

FIGS. 6(a) and 6(b) show front and side views, respectively, of the movable member 152 of clock spring connector 150 in accordance with a first embodiment of the present invention. The movable member 152 defines a central opening 153(1) formed through central recess 153, the central recess 153 having opposing flat surfaces (second parallel opposing flat surfaces) 154 and opposing curved surfaces 155. A tapered groove 156 is formed in one of the opposed flat surfaces, the groove 156 being parallel to an axis of rotation of the moving member 152. As described below, the groove 156 is used to reduce the range of free motion of the movable member 152 with respect to the steering wheel 170. A pair of spring-biased locking members 157 are connected along an outer circumference of the movable member 152 for engaging with grooves (not shown) formed on the fixed member 151 to prevent rotation of the movable member 152 relative to the fixed member 151 when the clock spring connector 150 is disengaged from the lock fixture 110. Finally, a turn signal canceling member 158 is formed on a back surface of the movable member 152 and engages a turn signal cancel cam (not shown) which is mounted on the lock fixture 110.

Figure 7:
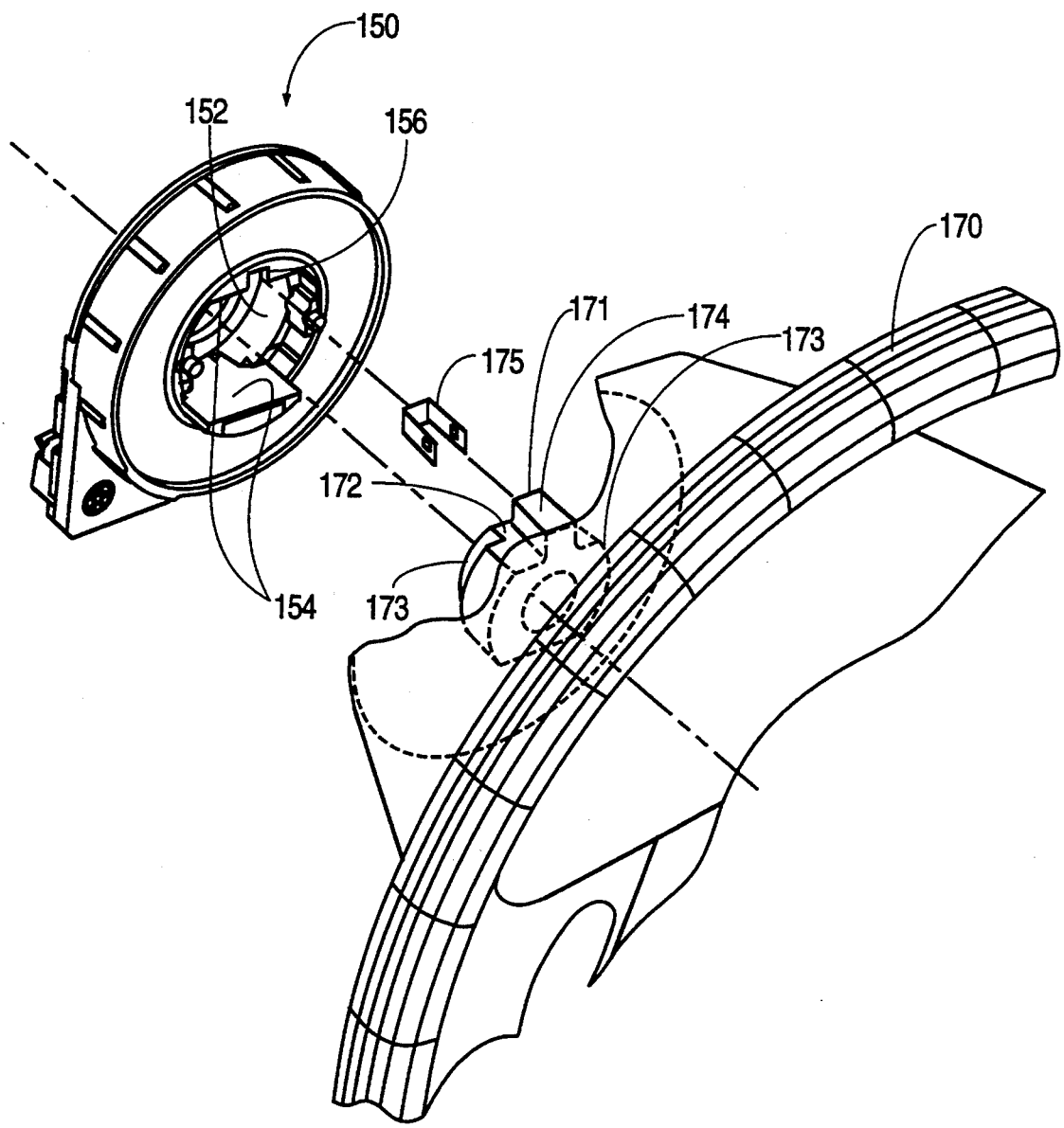
FIG. 7 shows a partial exploded perspective view of a steering column assembly in accordance with the first embodiment of the present invention.

FIG. 7 shows an enlarged perspective view of a steering column assembly in accordance with the first embodiment of the present invention. The steering wheel 170 includes an engaging portion 171 having opposed flat surfaces (first parallel opposed flat surfaces) 172 (one shown) and opposing curved surfaces 173. A ridge 174 is formed on one of the opposed flat surfaces 172, the ridge 174 being parallel to an axis of rotation of the steering wheel 170. A resilient clip 175 is positioned between the groove 156 and the ridge 174. In a preferred embodiment, the resilient clip 175 is a U-shaped spring steel member having portions which bend to absorb relative rotational movements between the engaging portion 171 and the walls of the recess 153, thereby preventing clicking noises caused by collisions between the engaging portion 171 and the walls of the recess 153. One of ordinary skill would recognize that other types resilient members may be substituted for the resilient clip 175. Further, a shim or other gap-filling member may be used.

Figure 8:
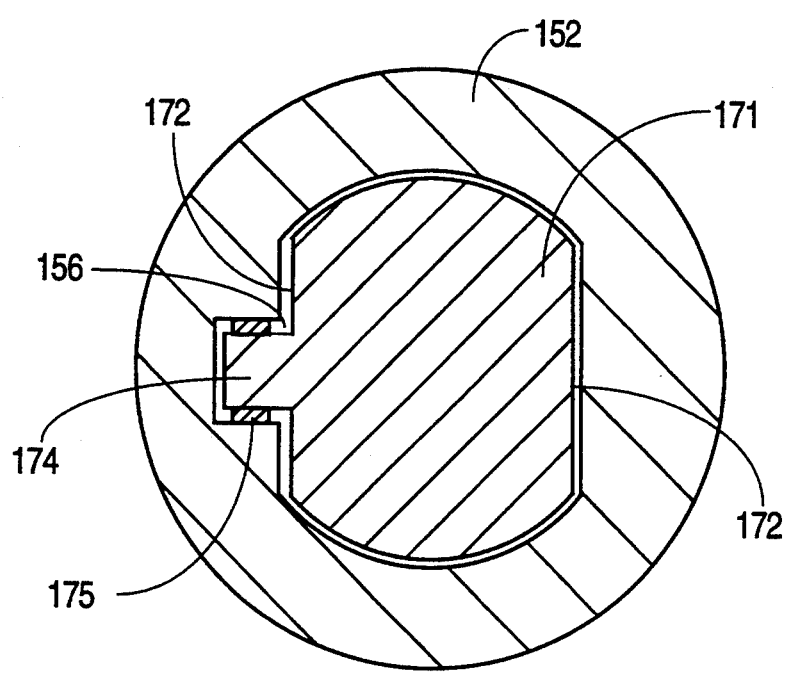
FIG. 8 shows a simplified front section view of the movable member and the engaging portion of the first embodiment of the present invention.

FIG. 8 shows a simplified section view of the movable member 152 and the engaging member 171 which illustrates the operation of the groove 156 and the ridge 174. As shown, the clip 175 is wedged between the walls of the groove 156 and the walls of the ridge 174 to eliminate a clearance which is provided to facilitate assembly. In operation, when the steering wheel 170 is manually rotated, the walls of the ridge 174 press against the walls of the groove 156 through the clip 175 without the free rotation associated with the prior art assembly (described above). As such, the steering column assembly 100 eliminates noise by preventing collisions between the engaging member 171 and the recess 153. Further, because the free rotation of the steering wheel 170 is eliminated, the sensitivity of a turn signal canceling mechanism is improved because response of the canceling member 158 to rotation of the steering wheel 170 is greatly improved.

Figure 9A:
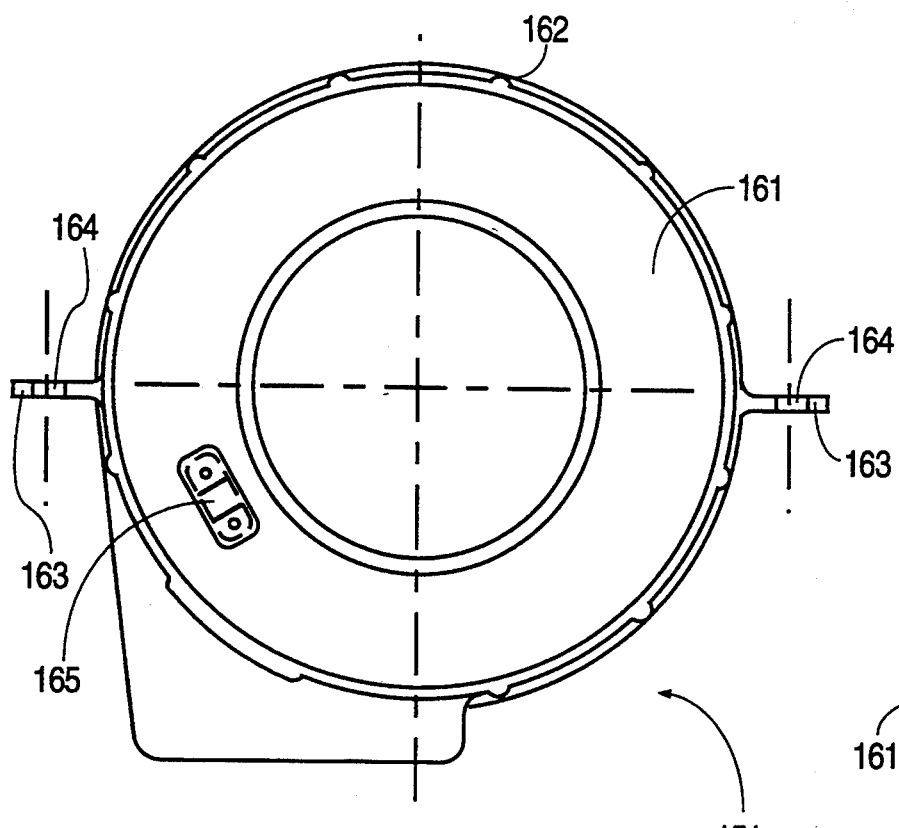
FIGS. 9(a), 9(b) and 9(c) show front, bottom and side views, respectively, of the fixed member of a clock spring connector in accordance with a second embodiment of the present invention.
Figure 9C:
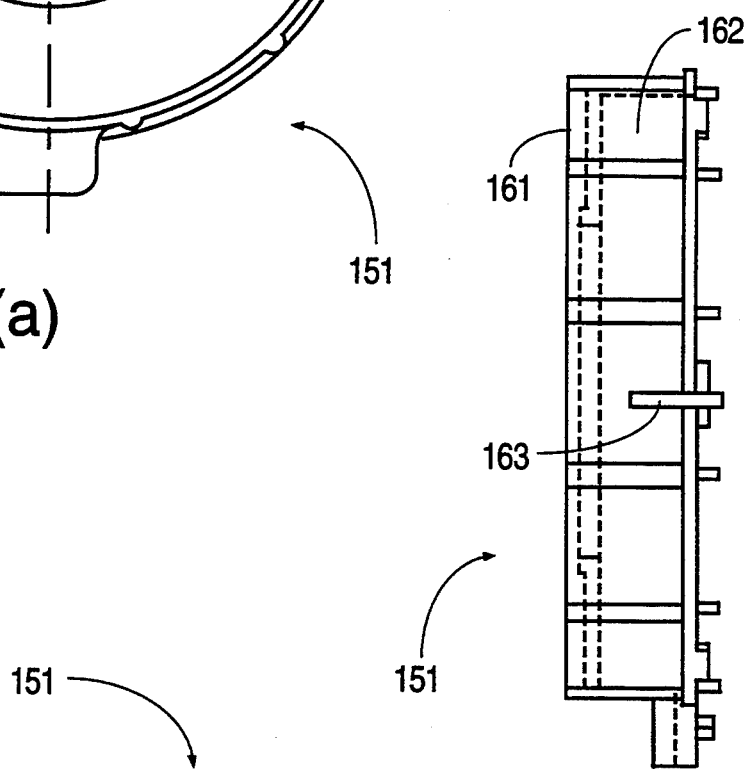
Figure 9B:
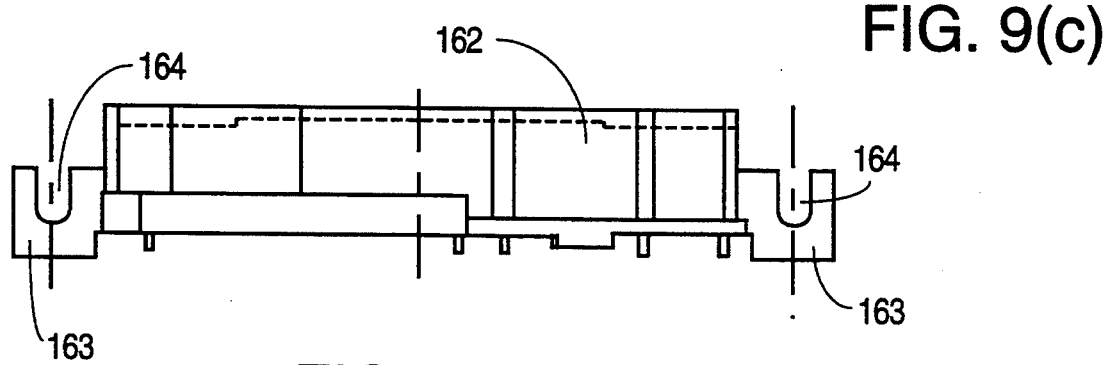

FIGS. 9(a) through 9(c) show front, top and side views, respectively, of the fixed member 151 of the clock spring connector 150 in accordance with a second embodiment of the present invention. The fixed member 151 includes a front wall 161 and an outer cylindrical wall 162. A pair of mounting flanges 163 are formed on and extend radially outward from the outer cylindrical wall 162. Each mounting flanges 163 defines a slot 164. In the presently-preferred embodiment of the present invention, a window 165 is formed on the front wall 161 and cooperates with a center indicating mechanism to identify a rotationally neutral position of the clock spring 150. The window 165 and center indicating mechanism are explained in detail in co-owned and co-pending U.S. application Ser. No. 07/987,915, filed Dec. 22, 1992 [Attorney Docket Number AECL-1961], which is incorporated herein by reference.

Figure 1:
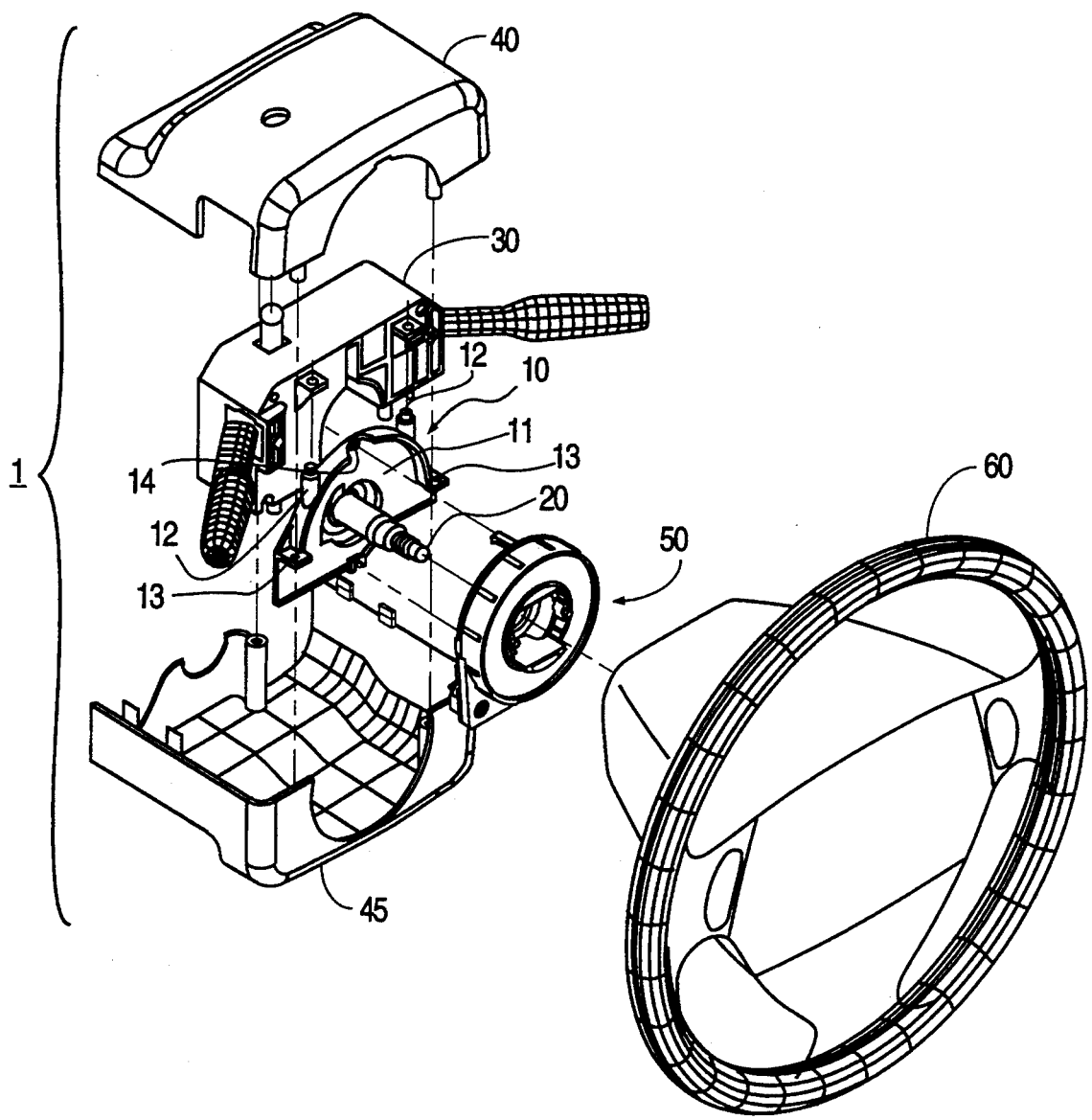
FIG. 1 shows an exploded perspective view of a prior art steering column assembly.
Figure 2:
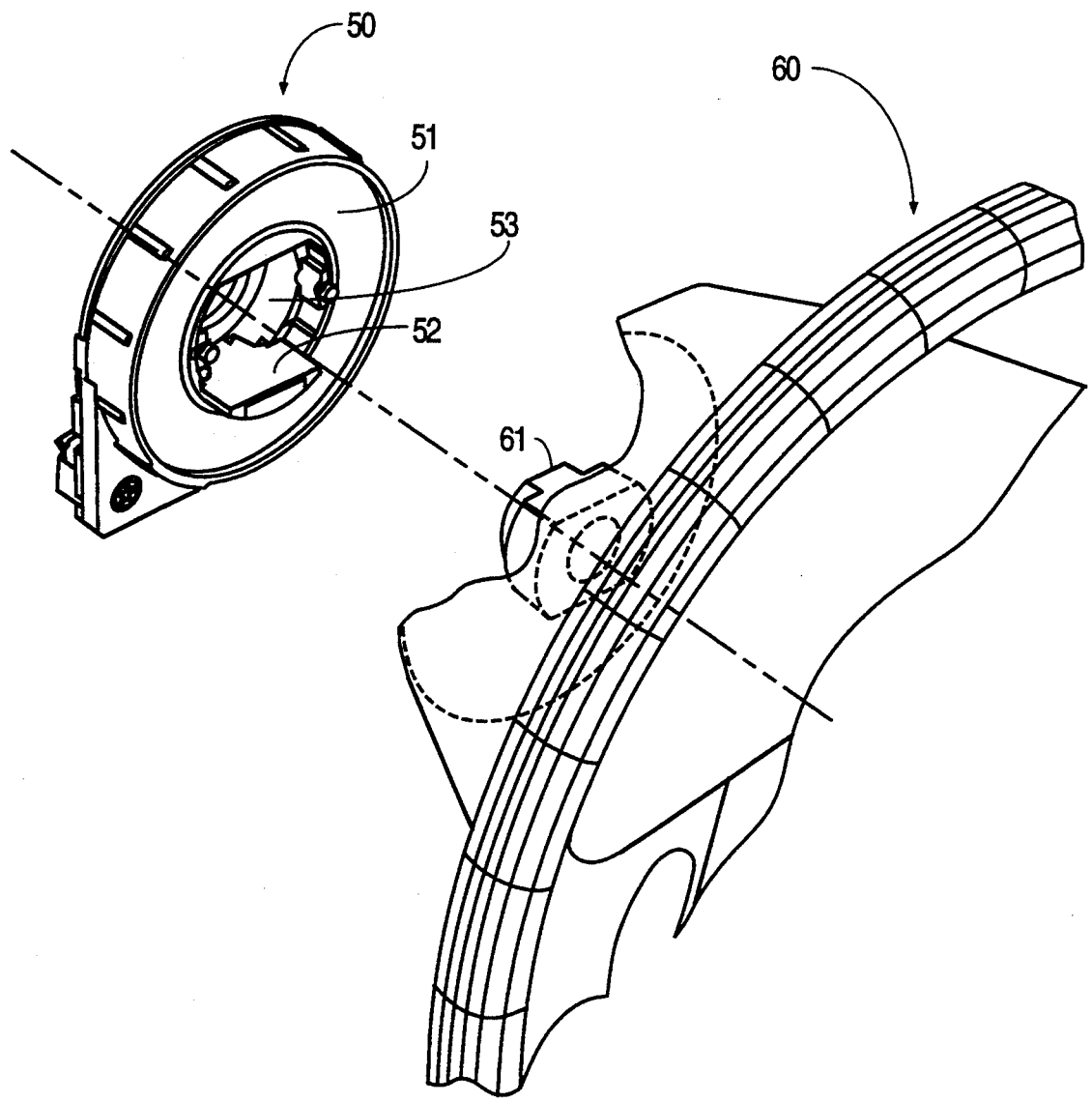
FIG. 2 shows an exploded perspective view of the clock spring connector and the steering wheel of FIG. 1.
Figure 3:
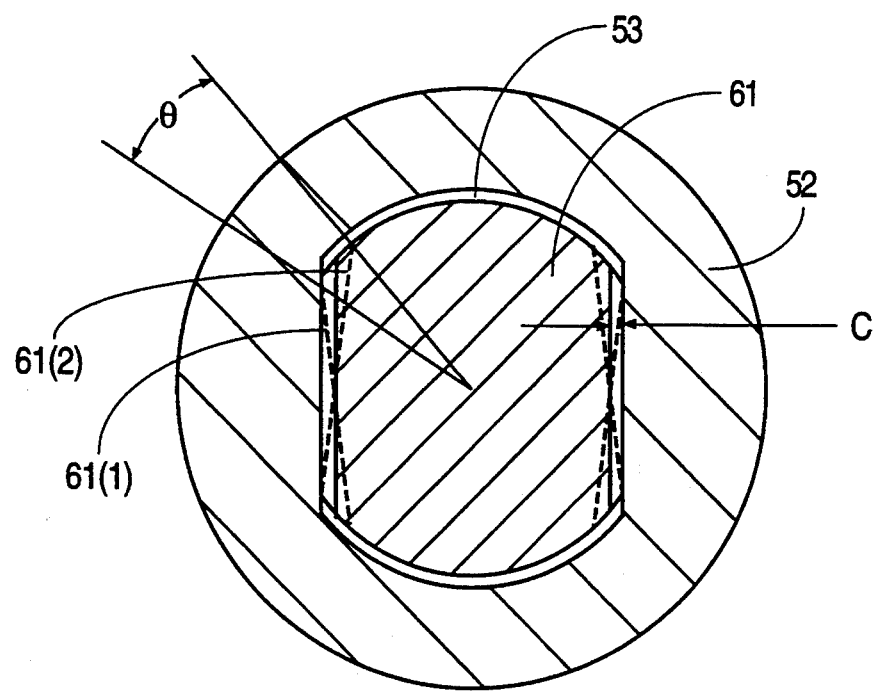
FIG. 3 shows a simplified section view of the movable member of the clock spring connector and the engaging portion of the steering wheel of FIG. 2.
Figure 4A:
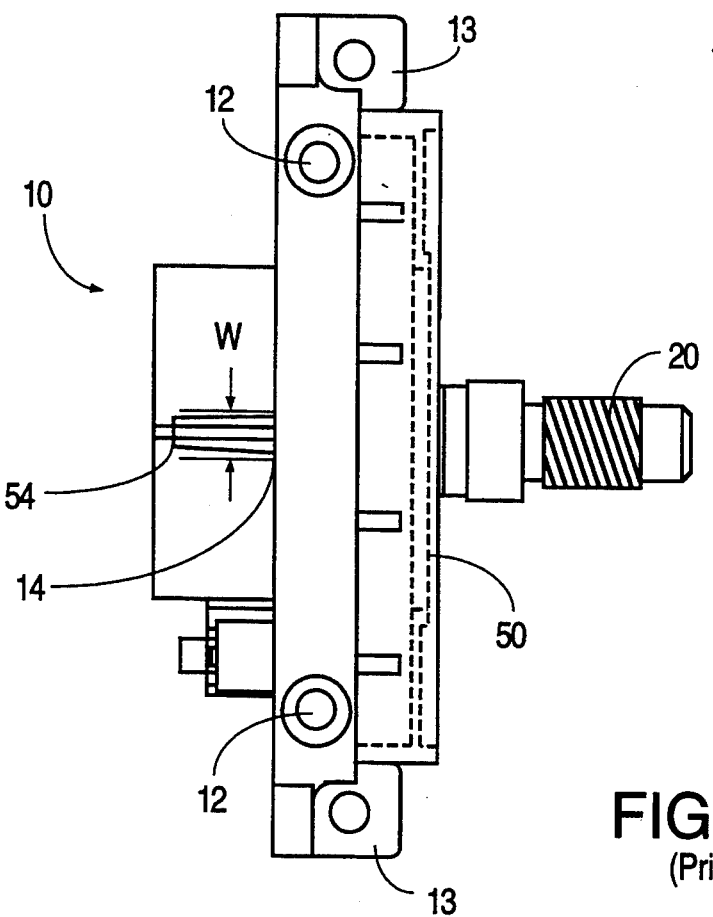
FIGS. 4(a) and 4(b) show top and side views, respectively, of the lock fixture and clock spring connector of FIG. 1.
Figure 4B:
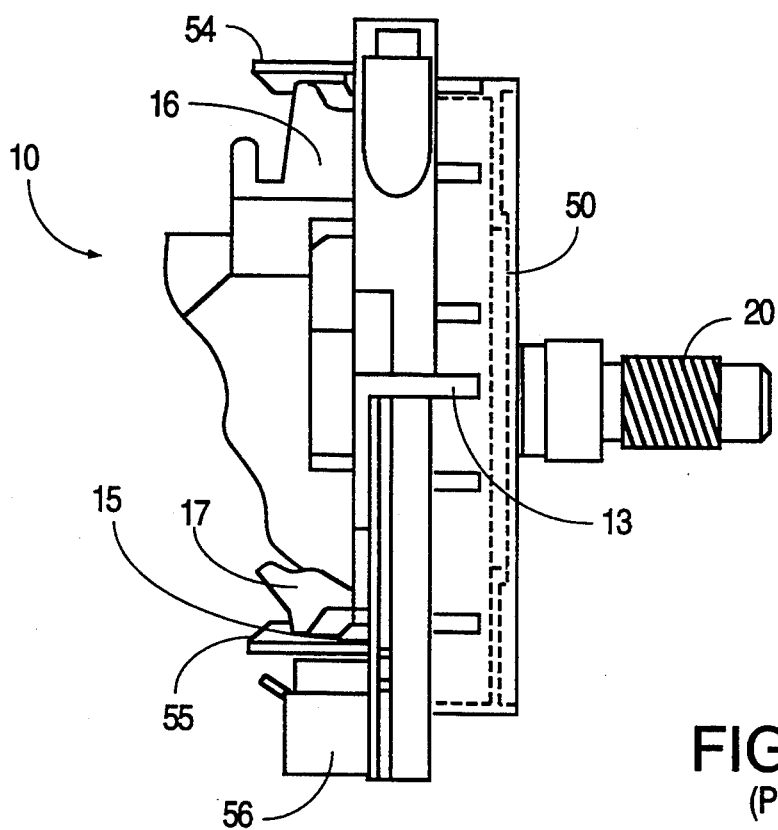
Figure 10:
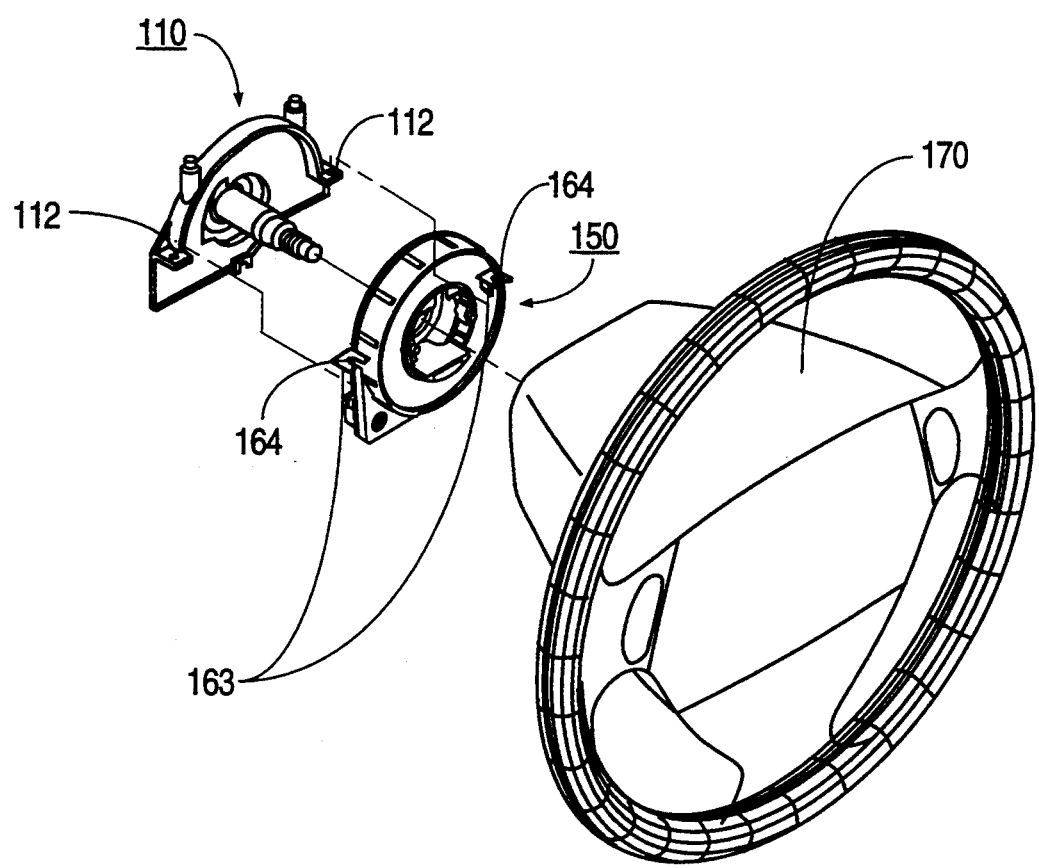
FIG. 10 shows a partial exploded perspective view of a steering column assembly in accordance with the second embodiment of the present invention.

FIG. 10 shows a partial exploded perspective view of a steering column assembly 100 in accordance with the second embodiment of the present invention. As indicated, when the clock spring connector 150 is mounted onto the lock fixture 110, the mounting flanges 163 rest on the horizontal flanges 112 such that the slots 164 are aligned with holes formed in the horizontal flanges 112. During an assembly process, after the clock spring connector 150 is mounted on the lock fixture 110, the upper housing 140 and lower housing 145 are connected to the lock fixture 110 using a pair of screws which extend from the lower housing 145, through the holes in the horizontal flanges 112, and into the upper housing 145 (see FIG. 1). When these screws are tightened, the upper housing 140 presses against the mounting flanges 163, thereby securing the mounting flanges 163 to the horizontal flanges 112. With the mounting flanges 163 secured in this manner, the fixed member 151 is prevented from moving relative to the lock fixture 110, thereby preventing the creation of noise. The above-described mounting flanges 163 are preferably used when associated horizontal flanges 112 are present on the lock fixture 110. An example of a lock fixture 110 including horizontal flanges is a model B 11207-E lock housing, made by Methode Electronics of Chicago, Ill., which is used in automobiles produced by Chrysler Corporation of Detroit, Mich.

Figure 11A:
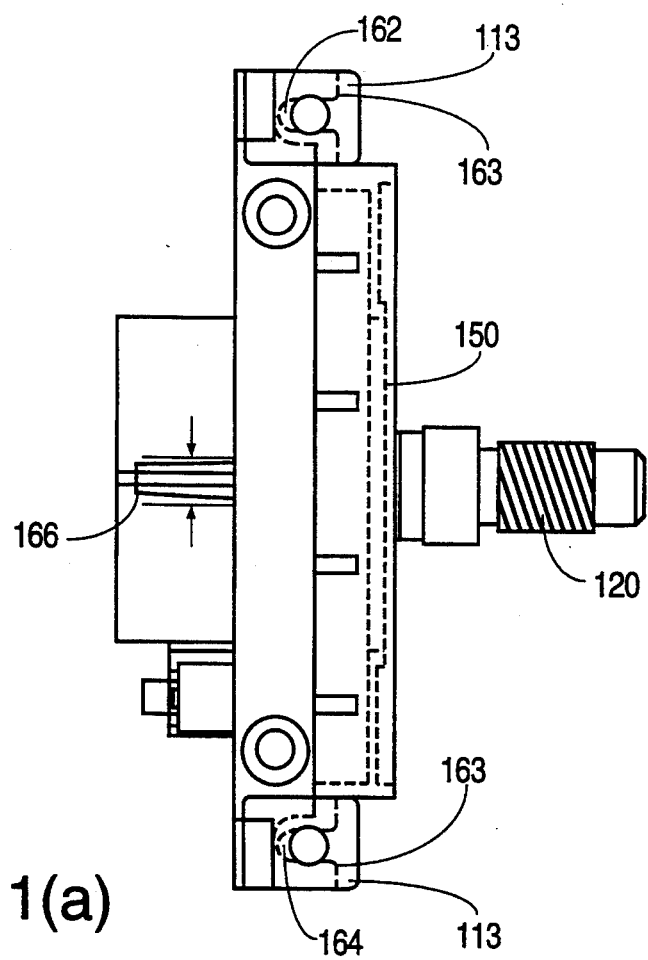
FIGS. 11(a) and 11(b) show top and side views, respectively, of the clock spring connector and the lock fixture according to the second embodiment.
Figure 11B:
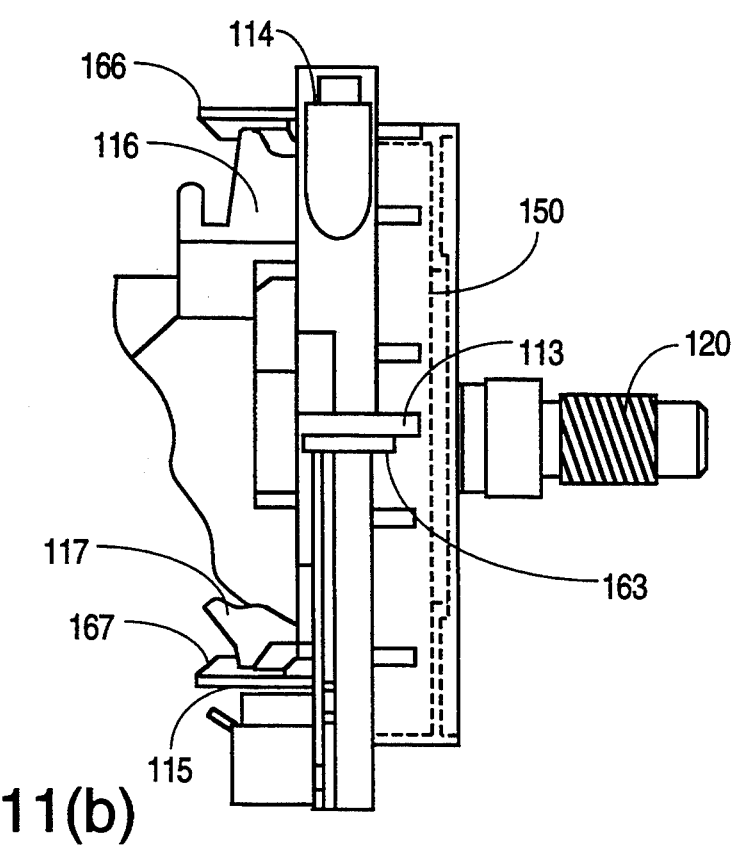

FIGS. 11(a) and 11(b) show top and side views of the mounting flanges 163 connected to the horizontal flanges 112 when the clock spring connector 150 is snap-coupled onto the lock fixture 110. According to a second aspect of the second embodiment, an upper locking finger 166 and a lower locking finger 167 are connected to a back plate of the fixed member 151 and are snap-coupled through an opening 114 (FIG. 5) and a slot 115 onto an upper vertical flange 116 and a lower vertical flange 117 formed on the lock fixture 110. As in the embodiment of FIGS. 9(c)-(c) and 10, the mounting flanges 163 are positioned on the horizontal flanges 112, and are secured by the upper housing 140 and the lower housing 145. In accordance with the embodiment of FIGS. 11(a) and 11(b), even if the upper locking finger 166 is damaged during assembly, a loud noise generated by the turn signal canceling mechanism is prevented because the clock spring connector 150 is secured to the lock fixture 110 by the mounting flanges 163.

Figure 12:
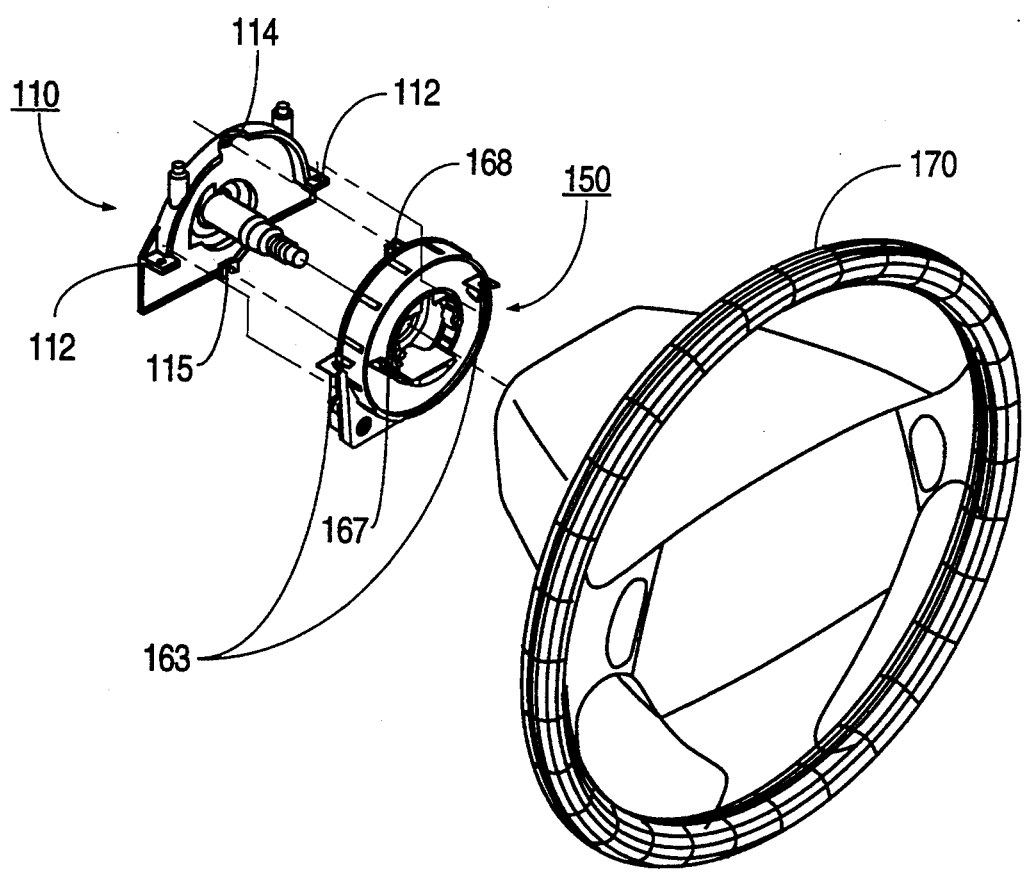
FIG. 12 shows an exploded perspective view of a clock spring connector and steering wheel in accordance with a third embodiment of the present invention.

FIG. 12 shows a partial exploded perspective view of a steering column assembly 100 in accordance with a third embodiment of the present invention. In accordance with the third embodiment, short, forked upper fingers 168 are used in place of the upper locking finger 166 (FIGS. 11(a) and 11(b)). As indicated, when the clock spring connector 150 is mounted onto the lock fixture 110, the mounting flanges 163 rest on the horizontal flanges 112, as in the second embodiment (described above), and in addition, the forked upper fingers 168 are snap-coupled to the edges of the opening 114 of the lock fixture 110. The forked upper fingers 168 are preferably used when an associated opening 114 is present on the lock fixture 110. An example of a lock fixture (housing) 110 including the opening 114 is the abovementioned model B 11207-E lock housing, made by Methode Electronics of Chicago, Ill.

Figure 13A:
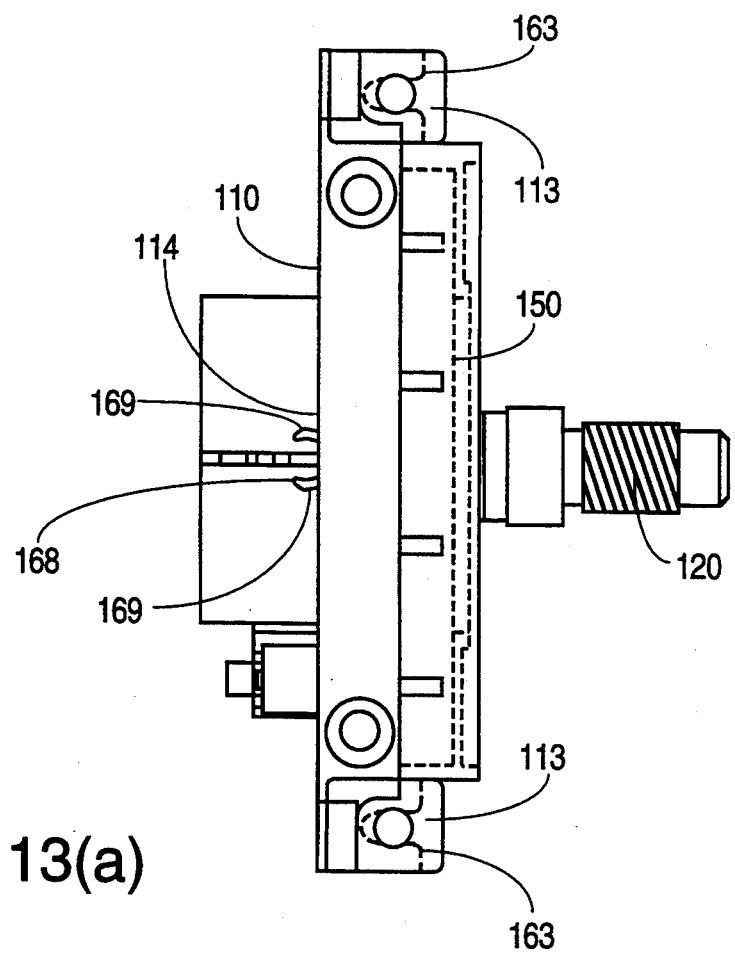
FIGS. 13(a) and 13(b) show top and side views, respectively, of the clock spring connector and the lock fixture according to the third embodiment.
Figure 13B:
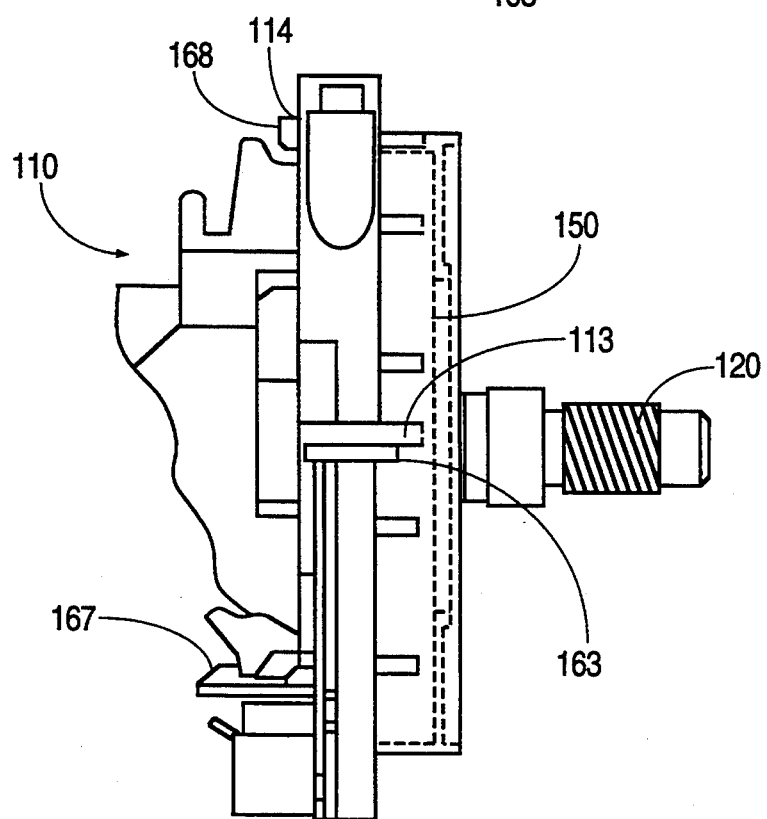

FIGS. 13(a) and 13(b) show top and side views of the lock fixture 110 and the clock spring connector 150 in accordance with the third embodiment of the present invention. As indicated, the forked locking fingers 168 extends only a short distance through the opening 114, and includes protrusions 169 which are forced outward to secure the forked locking fingers 168 to the lock fixture 110. In accordance with the third embodiment, because the forked locking fingers 168 extend only a short distance from the back plate 151(1) (see FIG 12) of the fixed member 151, the forked fingers 168 are less likely to be damaged during assembly, thereby providing a reliable method of securing the clock spring connector 150 to the lock fixture 110.

The foregoing embodiments are intended to be illustrative and not intended to limit the scope of the claims. Many additional and alternative embodiments according to this invention will be apparent to those skilled in the art. For example, the groove formed on the movable member and the ridge formed on the engaging member of the first embodiment may be switched. All such embodiments are intended to be covered within the scope of this invention, as defined in the following claims.

We claim:

1. A clock spring connector for providing an electrical connection between electronic equipment located on a steering wheel and an electrical system of an automobile, the steering wheel including an engaging portion having first parallel opposed flat surfaces and a ridge protruding from one of the first opposed flat surfaces, the clock spring connector comprising:
   a fixed member;
   a movable member rotatably connected to the fixed member, the movable member having a recess including second parallel opposing flat surfaces, one of the second parallel opposing flat surfaces defining a groove, the groove being perpendicular to said second parallel opposed flat surfaces, the groove being formed to receive the ridge formed on the engaging portion of the steering wheel such that, when the engaging portion is mounted in the recess, manual rotation of the steering wheel is transmitted to the movable member through contact between the groove and the ridge.

2. A clock spring connector of claim 1 wherein the fixed member includes a back plate and a forked locking finger extending from the back plate.

3. A clock spring connector comprising:
   a fixed member having an outer cylindrical wall a flat mounting flange fixedly connected to and radially extending from the outer cylindrical wall; and
   a movable member rotatably connected to the fixed member;
   wherein the flat mounting flange extend radially outward from the outer cylindrical wall of the fixed member; and
   wherein the fixed member includes a back plate and a forked locking finger extending from the back plate.

4. A steering column assembly comprising:
   a steering column;
   a lock fixture fixedly connected to an end of the steering column, the lock fixture including a front plate;
   a clock spring connector including a fixed member fixedly connected to the front plate and a movable member rotatably connected to the fixed member, the movable member defining a central opening and a recess including first parallel opposing flat surfaces;
   a steering shaft rotatably contained in the steering column and having an end portion extending from the lock fixture and through the central opening; and
   a steering wheel fixedly connected to the end portion of the steering shaft, the steering wheel including an engaging portion received in the recess of the movable member, the engaging portion having second parallel opposing flat surfaces;
   wherein a groove is defined by one of the first parallel opposing flat surfaces, the groove being perpendicular to the first parallel opposing flat surfaces and a ridge is formed on one of the second parallel opposing flat surfaces such that the ridge is received in the groove.

5. A steering column assembly of claim 4 wherein a resilient member is located between the groove and the ridge.

6. A steering column assembly of claim 4 wherein the fixed member includes an outer cylindrical wall and a flat mounting flange fixedly connected to and radially extending from the outer cylindrical wall;
   wherein the lock fixture includes a horizontal flange; and
   wherein the flat mounting flange is positioned on the horizontal flange.

7. A steering column assembly of claim 4 wherein the fixed member includes a back plate and a forked locking finger extending from the back plate; and
   wherein the lock fixture includes an opening for receiving the forked locking finger.

8. A combination comprising:
   a clock spring connector including a fixed member fixedly connected to the front plate and a movable member rotatably connected to the fixed member; and
   a steering wheel including an engaging portion received in the recess of the movable member, the engaging portion having second parallel opposing flat surfaces, the movable member defining a central opening and a recess including first parallel opposing flat surfaces;
   wherein a groove is defined by one of the first parallel opposing flat surfaces, the groove being perpendicular to the second parallel opposing flat surfaces and a ridge is formed on one of the second parallel opposing flat surfaces such that the ridge is received in the groove.

9. The combination of claim 8, further comprising a resilient member located between the groove and the ridge.

* * * * *